(12) United States Patent
Byrd et al.

(10) Patent No.: US 7,910,683 B2
(45) Date of Patent: Mar. 22, 2011

(54) TOUGH AND STRONGLY-ADHERENT ANTI-ICING COATINGS

(75) Inventors: Norman R. Byrd, Villa Park, CA (US); Douglas Gerald Soden, San Pedro, CA (US)

(73) Assignee: The Boeing Company, Chicago, IL (US)

( * ) Notice: Subject to any disclaimer, the term of this patent is extended or adjusted under 35 U.S.C. 154(b) by 558 days.

(21) Appl. No.: 11/957,006

(22) Filed: Dec. 14, 2007

(65) Prior Publication Data

US 2008/0096027 A1 Apr. 24, 2008

Related U.S. Application Data

(60) Continuation-in-part of application No. 11/697,846, filed on Apr. 9, 2007, which is a division of application No. 10/741,359, filed on Dec. 19, 2003, now Pat. No. 7,202,321, which is a continuation-in-part of application No. 10/455,070, filed on Jun. 5, 2003, now Pat. No. 6,809,169, which is a continuation-in-part of application No. 10/436,015, filed on May 12, 2003, now Pat. No. 6,797,795, which is a continuation-in-part of application No. 10/164,826, filed on Jun. 7, 2002, now abandoned.

(51) Int. Cl.
*C08G 77/26* (2006.01)
(52) U.S. Cl. .................. 528/26; 528/28; 428/447
(58) Field of Classification Search .......... 528/26, 528/28; 428/447
See application file for complete search history.

(56) References Cited

U.S. PATENT DOCUMENTS

| | | | |
|---|---|---|---|
| 4,275,184 A | 6/1981 | Bargain et al. | |
| 4,290,810 A | 9/1981 | Montgomery | |
| 4,439,337 A | 3/1984 | Nimerick et al. | |
| 5,100,992 A | 3/1992 | Cohn et al. | |
| 5,187,015 A | 2/1993 | Yorkgitis et al. | |
| 5,296,144 A | 3/1994 | Sternina et al. | |
| 5,328,768 A | 7/1994 | Goodwin | |
| 5,413,865 A | 5/1995 | Nakamura et al. | |
| 5,688,864 A | 11/1997 | Goodwin | |
| 5,844,053 A | 12/1998 | Nishida | |
| 5,980,990 A | 11/1999 | Goodwin | |
| 6,008,410 A | 12/1999 | Olli | |
| 6,191,248 B1 | 2/2001 | Rawlings et al. | |
| 6,245,387 B1 | 6/2001 | Hayden | |
| 6,353,135 B1 | 3/2002 | Olli | |
| 6,355,759 B1 | 3/2002 | Sherman et al. | |
| 6,379,751 B1 | 4/2002 | Schafer et al. | |
| 6,384,171 B1 | 5/2002 | Yamazaki et al. | |
| 6,461,537 B1 | 10/2002 | Turcotte et al. | |
| 6,797,795 B2 | 9/2004 | Byrd | |
| 6,809,169 B2 | 10/2004 | Byrd et al. | |

FOREIGN PATENT DOCUMENTS

| | | |
|---|---|---|
| JP | 1-168718 | 7/1989 |
| WO | WO 96/34029 | 10/1996 |

OTHER PUBLICATIONS

English language translation JP 1-168718, Jul. 4, 1989 (abstract only).
Hozumi et al., "Preparation of transparent water-repellent films by radio-frequency plasma-enhanced chemical vapour deposition", *Sci.* 32 (1997), pp. 4253-4259.
Hong et al., "Endurable Water-Repellent Glass for Automobiles", *Thin Film Solids* 351, (1999), pp. 274-278.

*Primary Examiner* — Margaret G Moore
(74) *Attorney, Agent, or Firm* — Alston & Bird LLP

(57) ABSTRACT

A polysiloxane(amide-ureide) which inhibits the ability of ice to adhere to a surface of a physical object when applied to a surface of a substrate. The polysiloxane(amide-ureide) has a backbone including:

(i) at least one diamine-terminated polysiloxane of the general formula:

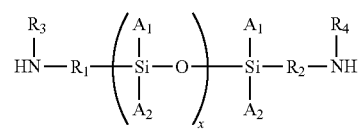

wherein, for each unit of the polysiloxane $R_1$ and $R_2$ are independently selected from the group consisting of $C_1$ to $C_{10}$ alkyls, aryls, and polyaryls; for each unit of the polysiloxane $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles; for each unit of the polysiloxane $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; for each unit of the polysiloxane, x is a number from 1 to 1000;

(ii) at least one aromatic diamine;
(iii) at least one diisocyanate; and
(iv) at least one halide substituted dicarboxylic acid.

30 Claims, No Drawings

TOUGH AND STRONGLY-ADHERENT ANTI-ICING COATINGS

CROSS-REFERENCE TO RELATED APPLICATIONS

This application is a continuation-in-part of U.S. patent application Ser. No. 11/697,846, filed on Apr. 9, 2007, which is a divisional application of U.S. application Ser. No. 10/741,359, filed Dec. 19, 2003, now U.S. Pat. No. 7,202,321, which is a continuation-in-part of U.S. application Ser. No. 10/455,070 filed Jun. 5, 2003, now U.S. Pat. No. 6,809,169, which is a continuation-in-part of U.S. application Ser. No 10/436,015, filed on May 12, 2003, now U.S. Pat. No. 6,797,795, which is a continuation-in-part of U.S. patent application Ser. No. 10/164,826, filed on Jun. 7, 2002, now abandoned, the contents of each are incorporated herein by reference in their entirety.

FIELD OF THE INVENTION

This invention relates to polymeric coatings which inhibit the adhesion of ice to various surfaces including transparencies. The invention also relates to compositions and methods of making polysiloxane(amide-ureide) compounds that provide a durable, long-lasting, anti-ice coating when applied to a substrate.

BACKGROUND OF THE INVENTION

The everyday buildup of ice upon the surfaces of mechanical, physical, and natural objects is a familiar annoyance, and quite often a safety hazard. The slick layers of ice that form on highways, driveways, and walkways make transportation difficult. The masses of ice that accumulate within or upon industrial, agricultural, or other mechanical equipment make operation of the equipment difficult or impossible; and the weight of ice that weighs upon power lines, buildings, and signs often causes damage to those structures.

Ice accumulation upon vehicles, such as air or marine vehicles, poses a challenging problem. For example, ships traveling in the arctic and other cold climates may have ice form thereon, thereby disadvantageously increasing the weight and decreasing the maneuverability of the ships.

Similarly, buildup of ice upon the wings and components of an aircraft is of particular concern. The lift generated by the wings, and thus the ability of the aircraft to become and remain airborne, is dependent on the shape of the wings. Even a small accumulation of ice upon the surface of the wings can significantly increase drag and dramatically reduce lift. Further, ice buildup along control surfaces of the aircraft can impede the movement of those surfaces and prevent proper control of the aircraft.

Ice formation and accumulation on transparencies such as windows of air, marine and land vehicles is particularly troublesome. It is well known that ice formation and adhesion to vehicular windows can make safe operation dreadfully difficult. Many approaches have been attempted to provide a means of controlling ice formation and accumulation on transparencies. For instance, the use of per-fluoroalkyl silanes has been employed. However, compositions of this type lose their water-repellant nature quickly and need to be regenerated frequently. The use of quaternary ammonium siloxane-based materials have been incorporated into windshield washing fluids, but this approach fails to provide an anti-icing coating and readily washes away during use. Others have attempted to utilize silicone rubber. However, the application of silicon rubber requires a chemical vapor deposition process and once in use it undergoes rapid wear and picks up oils and dirt.

Additional approaches to mitigate the problem of ice formation and accumulation on transparencies include the use of metal alkoxides (e.g. silicon alkoxides) and using a sol-gel process to form a metal oxide layer on a glass substrate followed by using another sol-gel process to form a water-repellent layer on top of the metal oxide layer. The process, however, requires a high temperature to effect the required coating; hence, it is not suitable for rapid application to glass by merely spraying the coating onto the glass. Others techniques include using a sol-gel based spray coating with a silica underlayer and a fluorocarbon overlayer to obtain water-repellency for use in automobile glass. It has been found, however, that the water-repellency degrades from sunlight, water and abrasion.

Although numerous approaches have been explored for easily imparting a durable and long lasting surface coating to various substrates including transparencies, these past attempts have failed.

What is needed is a durable surface coating with long lasting anti-icing and/or de-icing properties which can be applied to a variety of substrates including transparencies. What is further needed is a surface coating that may be easily applied to the surface, especially to transparencies of a vehicle such as an aircraft, and which retains its functionality under a variety of environmental conditions, such as those typically encountered by a commercial or military vehicle. What is further needed is a method of applying the surface coating to at least a portion of a vehicle.

BRIEF SUMMARY OF THE INVENTION

The present invention is directed to polysiloxane(amide-ureide) coatings capable of inhibiting the accumulation of ice upon a surface of a wide variety of substrates. Notably, coatings according to embodiments of the present invention exhibit improved adhesion to numerous substrates including transparencies. Additionally, these coatings provide greater durability over extended periods of time while exposed to a variety of environmental conditions. Coatings according to embodiments of the present invention can by applied to a wide variety of structures such as power lines, bridges, marine vehicles, aircraft and spacecraft, among others.

The polysiloxane(amide-ureide) polymers according to embodiments of the present invention form durable, long lasting, anti-ice coatings when employed applied to a surface of a substrate. When applied to a surface, the polysiloxane (amide-ureide) coating disrupts bonding between the ice and the coated surface. Moreover, when ice does form, the coating disrupts the hydrogen bonding between the ice and the coated surface, thereby diminishing the ability of the ice to adhere to the surface. The ability of the coating to adhere to surfaces including transparencies such as glass, and the ability of the coating to inhibit the formation of ice upon coated surfaces, makes the polysiloxane(amide-ureide) particularly useful for inhibiting the formation of ice on aircraft or other vehicles. The polysiloxane(amide-ureide) according to embodiments of the present invention comprises a polymer having a backbone including at least one diamine-terminated polysiloxane of the general formula:

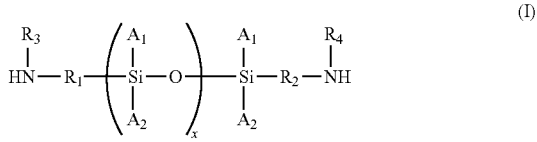

wherein, for each unit of the polysiloxane $R_1$ and $R_2$ are independently selected from the group consisting of $C_1$ to $C_{10}$ alkyls, aryls, and polyaryls; for each unit of the polysiloxane $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles; for each unit of the polysiloxane $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; for each unit of the polysiloxane, x is a number from 1 to 1000; at least one aromatic diamine; at least one diisocyanate; and at least one halide substituted dicarboxylic acid. In one preferred embodiment, the polymer is terminated with at least one substituted aryl, alky, or hetero-silane, wherein the substitution can be an amino, hydroxyl, mercaptal group, or any other group such that the silane is capable of reacting with either an acid chloride, isocyanate, or isothiocyanate. More preferably, the silane comprises a trialkoxy-aminosilane. Coatings of the polysiloxane(amide-ureide) render a surface of a substrate icephobic and resistant to corrosion. The increased quantity of aromatic compounds incorporated into the backbone of the polymer result in increased hydrophobicity and enhances corrosion resistance by minimizing the penetration of ionic moieties responsible for ionic and electromotive corrosion.

Polysiloxane(amide-ureide) polymers according to embodiments of the present invention are readily produced by reacting at least one diamine-terminated polysiloxane, at least one aromatic diamine; at least one diisocyanate; at least one halide substituted dicarboxylic acid; and at least one substituted aryl, alky, or hetero-silane, wherein the substitution can be an amino, hydroxyl, mercaptal group, or any other group such that the silane is capable of reacting with either an acid chloride, isocyanate, or isothiocyanate. Preferably, the silane comprises a trialkoxy-aminosilane. Polysiloxane (amide-ureide) polymers produced accordingly can be dissolved in a suitable solvent and sprayed as a solution onto the surface of a substrate to form a protective coating thereon and render the surface icephobic and resistant to corrosion. Alternatively, the polymeric melt can be applied to the surface of a substrate as a polymer film and allowed to cure. In various embodiments, the polymer film is substantially transparent making it ideal for coating transparencies.

Thus, the resulting polymer contains functional amide groups, functional urea groups and has an amorphous domain and crystalline domain and some non-linear orientation of the polymer molecules. Each of the amide functionality, the urea functionality, and the non-linearity of the polymer improve the polymer's strength or anti-icing properties. Furthermore, the amide/urea moieties create crystallinity domains within the polymer via intermolecular hydrogen bonding which, in conjunction with the amorphous domains of the polysiloxane and the non-linearity of the diacid or diisocyanate, create a toughened polymer with enhanced physical properties.

The polysiloxane(amide-ureide) forms a durable, continuous coating when applied to a surface of a substrate, such as the aluminum or titanium skin on the external surface of an aircraft or glass windshields or windows. The polysiloxane (amide-ureide) also forms a suitable coating layer when applied to a painted surface or to composite structure such as resin matrices containing graphite, carbon, or glass fibers. Aircraft, ships, and other vehicles coated with the polysiloxane(amide-ureide) remain relatively free of ice. If ice does form upon the coated surface, adhesion of ice to the surface is minimal, such that the ice is removed from the surface by any slight application of physical force. The coating is particularly useful to coat the lift and control surfaces of an aircraft to prevent or slow the formation of ice on these surfaces and for coating the inlets of aircraft to prevent the accumulation of ice on the inlets. In one preferred embodiment the coating is particularly useful for coating transparencies such as glass.

Any ice that does form tends to fall off under the aerodynamic conditions related to operation of the vehicle. For instance, airplanes coated with the polysiloxane(amide-ureide) have improved handling and safety characteristics under conditions which make the surfaces of the airplane otherwise susceptible to icing. Similarly, ice that forms on other surfaces, such as the roof of a car, the windshield of a car, or the smooth surface of a building, is easily removed by shearing action or windshield wipers.

DETAILED DESCRIPTION OF THE INVENTION

The present invention now will be described more fully hereinafter. Indeed, this invention may be embodied in many different forms and should not be construed as limited to the embodiments set forth herein; rather, these embodiments are provided so that this disclosure will satisfy applicable legal requirements.

The invention provides an improved surface coating which inhibits the ability of ice to form upon a coated surface. The surface coating is particularly effective when applied to coated or uncoated metal, including aerospace alloys of aluminum, steel, or titanium or to resin composites having glass, ceramic, or carbon fiber reinforcement and is particularly useful for inhibiting the formation of ice upon the control or aerodynamic lifting surfaces of aircraft or space vehicles. In one preferred embodiment, the coating also forms an effective ice inhibitor when used on transparencies such as glass.

The polysiloxane(amide-ureide) according to embodiments of the present invention comprises a polymer having a backbone including at least one diamine-terminated polysiloxane of the general formula (I):

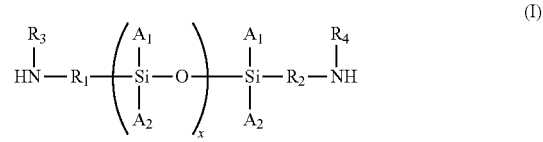

wherein, for each unit of the polysiloxane $R_1$ and $R_2$ are independently selected from the group consisting of $C_1$ to $C_{10}$ alkyls, aryls, and polyaryls;

for each unit of the polysiloxane $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles;

for each unit of the polysiloxane $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles;

for each unit of the polysiloxane, x is a number from 1 to 1000; and at least one aromatic diamine; at least one diisocyanate; and at least one halide substituted dicarboxylic acid. In one preferred embodiment, the random polymer is terminated with at least one substituted aryl, alky, or hetero-silane, wherein the substitution can be an amino, hydroxyl, mercaptal group, or any other group such that the silane is capable of reacting with either an acid chloride, isocyanate, or isothiocyanate; or, alternatively, the substituted aryl, alky, or heterosilane can be added to the unsaturated moiety of either the itaconic group or maleic moiety, via a Michael addition reaction, and used as a binding site to glass or other inorganic substrates via hydrolysis of the trialkoxy group. In a preferred embodiment, the substituted aryl, alky, or hetero-silane comprises a trialkoxy-aminosilane.

In various embodiments, the polymer can have the following general formula:

-(m/n)-(a/b)-(m/n)-(x/y)- wherein, m, n, a, b, x, y are mole fractions defined as follows:
"m" is polysiloxane diamine as described above and illustrated in general formula (I);
"n" is an aromatic diamine as described in general formula (II);
"a" is a diacid halide as described in general formula (IV);
"b" is a diacid halide as described in general formula (IVa or IVb) but different from "a";
"x" is a diisocyanate as described in general formula (V);
"y" is a diisocyanate as described in general formula (V), but different from "x";
"m" and "n" can have any combination of values from 0.05 to 0.95 such that m+n=1;
"a", "b", "x" and "y" can have any values from 0 to 1 such that a+b+x+y=1 and (a+b)≧0.01 and (x+y)≧0.01.

With these combinations (in Molar amounts), the percent crystallinity of embodiments of the present invention can be varied, at will, depending on the ultimate use of the polymer. For instance, the greater the polysiloxane to amide-ureide ratio, the crystallinity of the polymer is reduced, and vice versa.

In one alternative embodiment, "m" and "n" can have any combination of values from 0.15 to 0.85 such that m+n=1, while other embodiments can include "m" and "n" having any combination of values from 0.25 to 0.75 such that m+n=1. In one additional embodiment, "m" and "n" can have any combination of values from 0.4 to 0.6 such that m+n=1.

The alkyls may be linear or branched, saturated or unsaturated, halogenated or non-halogenated. The aryls are preferably selected from $C_6$, $C_{10}$, and $C_{14}$ aryls and may be substituted or non-substituted, including halogenated or non-halogenated aryls. The aryls may include alkylaryls and the alkylaryls may be linear or branched, saturated or unsaturated, halogenated or non-halogenated. The polyaryls are two or more aryls linked by at least one carbon-carbon bond and are preferably selected from biphenyl and terphenyl. The polyaryls may be linear or branched, and substituted or non-substituted, including halogenated or non-halogenated. The heterocycles may be saturated or unsaturated, halogenated or non-halogenated.

In one embodiment, the polysiloxane(amide-ureide) is formed by reacting an amine-terminated polysiloxane, an aromatic diamine, a halide substituted dicarboxylic acid, and a diisocyanate. In one embodiment, the polysiloxane(amide-ureide) is formed by also reacting a trialkoxy-aminosilane. Preferably, the trialkoxy-aminosilane is an aminopropyl silane which results in the polysiloxane(amide-ureide) being terminated with the trialkoxy-aminosilane residue. Another way of introducing the trialkoxy-aminosilane, according to one embodiment, is to have the amino group added to the olefinic moiety of either the itaconic or maleic constituent. The reaction is generally performed in a solvent such as methylene chloride, tetrahydrofuran, dimethyl acetamide, methyl ethyl ketone, acetone or toluene at an elevated temperature. The reaction temperature is generally governed by the choice of solvent for carrying out the reaction. In one embodiment, the reaction can be performed in toluene at an elevated temperature, for instance around 100° C. In one alternative embodiment, the reaction can be performed in MEK at an elevated temperature of about 50° C.

One preferred polysiloxane(amide-ureide) is created by reacting at least one aromatic diamine, as shown in general formula (II) provided below, at least one high molecular weight diamine-terminated polysiloxane as illustrated in general formula (I) with at least one halide substituted dicarboxylic acid, examples of which are shown as structures (IV), (IVa) and (IVb), at least one non-linear diisocyanate shown as structure (V), and at least one trialkoxy-aminosilane (VI), to form a polysiloxane(amide-ureide) random polymer terminated by trialkoxy-aminosilane groups; alternatively, the trialkoxy-aminosilane can be added to an unsaturation site as found in either the itaconic or maleic moiety.

The aromatic diamine can have the general formula:

$$H_2N—Ar—NH_2 \quad (II)$$

wherein Ar can be any aryl, and polyaryl residue including any heterocyclic or polycyclic aromatic residue. Some examples of suitable aromatic diamines include, but are not limited to ortho-tolidine, meta-tolidine and diphenyldiamine.

Representative of some, although not all, of the compounds that are suitable aromatic diamines are as follows:
2,5-diaminobenzotri-fluoride; 2,2'-Bis(trifluoromethyl)benzidine;
3,3'-Bis(trifluoromethyl)benzidine; 4,4'-methylene dianiline;
2,2-Bis [4(4-aminophenoxy)phenyl]hexafluoropropane;
2,2-Bis [4 (4-aminophenoxy)phenyl]propane; 4,4'-oxydianiline;
4,4'-diaminodiphenyl sulfide; 4,4'-diaminophenylsulfone;
1,4-Bis(4-aminophenoxy)benzene; 4,4'-Bis(4-aminophenoxy)-Biphenyl; 1,3-Bis(4-aminophenoxy)benzene;
1,3-Bis(3-aminophenoxy)benzene; o-tolidine sulfone;
3,3'-5,5'-tetramethylbenzidine; 2,7-Diamino fluorene;
2,4-Diamino-6-(3,5-difluorophenyl)-1,3,5-triazine;
1,3-Bis(4-aminophenoxy) propane;
2,4-Diamino-6-phenyl-1,3,5-triazine; 2,6-Diamino pyridine; and
2,4-Diamino-6 [3-(trifluoromethyl)phenyl]-1,3,5-triazine; among others.

The aromatic diamines assist in forming a polysiloxane (amide-ureide) having a greater degree of coplanarity and hence a greater chain-to-chain interaction which increases the effect of the crystallinity domain and decreases the effect of the amorphous domain structure previously obtained in U.S. Pat. No. 6,797,795. As such, coatings according to embodiments of the present invention exhibit an increased toughness and adhesion to smoother surfaces such as transparencies. The aforementioned list of suitable aromatic diamines is merely a short list of specific compounds that can be employed according to various embodiments of the present invention. Many aromatic diamines, heterocyclicdiamines, or polyamines would also give the necessary interchain interactions.

The amine-terminated polysiloxane has the general formula:

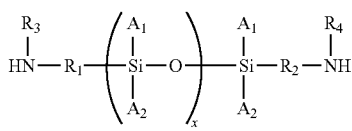
(I)

wherein $R_1$, $R_2$, $R_3$, $R_4$, $A_1$, $A_2$, and x are as defined above. If any of the $R_1$, $R_2$, $R_3$, $R_4$, $A_1$, $A_2$ groups are aryl, then those aryl groups are preferably phenyl.

$A_1$ and $A_2$ need not be regularly repeating patterns of hydrogen, alkyl, aryl, or polyaryl groups. For instance, the polysiloxane (I) may have a wide variety of randomly dispersed $A_1$ and $A_2$ groups throughout the length of the polysiloxane.

Although the number of repeat units, x, in the polysiloxane (I) may be as low as one, the average is generally between about 200 and 1,000, and is preferably between about 200 and 500. The polysiloxane may be linear or branched. When branched, the $R_1$, $R_2$, $A_1$, or $A_2$ groups are a site of branching. Branching is one method of obtaining a crosslinked endproduct.

Polysiloxane diamines such as those of structure (I) are commercially available from United Chemical Technologies, Inc. in Bristol, Pa., and also from Dow Chemical Co., Midland, Mich. The preferred polysiloxanes are linear, though branched polysiloxanes may also be used.

A halide substituted dicarboxylic acid ("diacid halide") reacts with both the polysiloxanes (I) and the aromatic diamines (II). For instance, one potential subunit is exemplified by structure (III):

The fumaryl and maleiyl halides are trans and cis variations of one another having the following formulas:

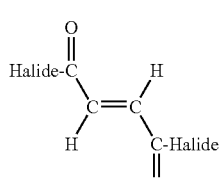
Fumaryl halide (trans)

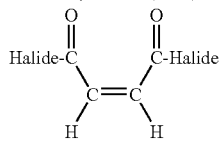
Maleiyl halide (cis)

The incorporation of the fumaryl halide and/or the maleiyl halide act to limit the degree of freedom of the polyamide (III) produced by the reaction of the aromatic diamine (II) or polysiloxane diamine (I) with the dicarboxylic acid (IV). When reacted, the amine groups of the diamine polysiloxanes (I) displace the halides and bond with the carboxyl carbon of the fumaryl halides or maleiyl halides. Once bonded, the unsaturated carbon linkage prevents the resulting polyamide (III) from rearranging into a stable spatial orientation, and is particularly useful in preventing the polyamide (III) from taking on a linear or near-linear orientation.

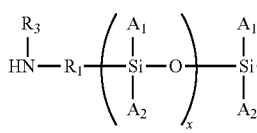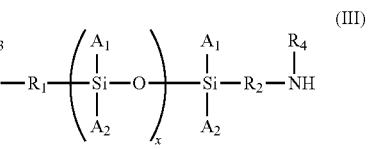
(III)

It should be noted that structure (III) is merely one example of how the diacid halid can react. For instance, the diacid may react with two aromatic diamines (II) or alternatively with one aromatic diamine (II) and one polysiloxane (I).

The halide substituted dicarboxylic acid used in the reaction is a low molecular weight dicarboxylic acid wherein the hydroxyl group from each carboxylic acid component has been replaced with a halide constituent. The dicarboxylic acid is either an aliphatic or aromatic compound with halogen substituted carboxylic acid endgroups. Preferred aliphatic dicarboxylic acid components have ten or less carbons, with examples of the diacid halides including but not limited to malonyl halides, succinyl halides, glutaryl halides, adipyl halides, sebacyl halides, maleiyl halides, fumaryl halides, and itaconyl halides. Examples of aromatic substituted dicarboxylic acids include terephthalic acid, isophthalic acid, 2,6-naphthalene dicarboxylic acid, or phthalic acid, among others. Polyfunctional substituted dicarboxylic acids may be used with the invention to promote crosslinking.

Examples of commercially available aliphatic substituted dicarboxylic acid components are fumaryl chloride, succinyl chloride, and maleiyl chloride, each available from Aldrich™ of Milwaukee, Wis.

Preferably, at least a portion of the substituted dicarboxylic acids are selected from fumaryl halides and maleiyl halides.

In addition to the incorporation of fumaryl halide and/or the maleiyl halide, itaconyl halide can also be incorporated into the polysiloxane(amide-ureide). One preferred itaconyl halide is itaconyl dichloride as shown in (IV.a); or alternatively succinyl chloride as shown in (IV.b):

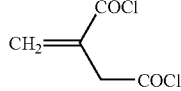
(IV.a.)

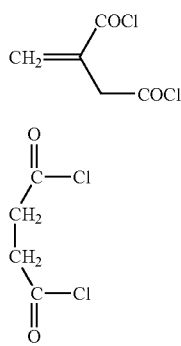
(IV.b.)

By incorporating itaconyl dichloride or the like as an amide-linking moiety, the resulting polysiloxane(amide-ureide) is further enhanced because after the itaconyl halide reacts with the diamines (i.e. the aromatic diamines and/or the polysiloxane diamines), the highly reactive vinyl side group of the itaconyl moiety is capable of undergoing crosslinking. Thus, by incorporated a percentage of the itaconyl moiety of from one mole percent to 60 mole percent the resulting polysiloxane(amide-ureide) coating exhibits a greater toughness than those described in U.S. Pat. No. 6,797,795. The itaconyl vinyl group can also be a site for adding the substituted aryl, alky, or hetero-silane, wherein the substitution can be an amino, hydroxyl, mercaptal group, or any other group such that the silane is capable of reacting with either an acid chloride, isocyanate, or isothiocyanate (preferably, the silane comprises a trialkoxy-aminosilane); via a Michael addition to the double bond. The resultant addition product, after hydrolysis of the trialkoxy groups can facilitate bonding to an inorganic substrate, such as a glass substrate, or can crosslink with itself via reaction of two —Si—OH groups. Another advantage to the itaconyl olefin is that it is equivalent to being an acrylic moiety which is capable of undergoing crosslinking with an ultraviolet (UV) source.

In one embodiment, the percentage of the itaconyl moiety incorporated can be from one mole percent to 45 mole percent, or from one mole percent to 20 mole percent, or from 5 mole percent to 15 mole percent, or from 8 mole percent to 12 mole percent. In one alternative embodiment, the percentage of the itaconyl moiety incorporated can be from 10 mole percent to 60 mole percent, or from 20 mole percent to 50 mole percent, or alternatively from 30 mole percent to 40 mole percent.

The degree of linearity of the polyamide (III), and therefore of the resulting polysiloxane(amide-ureide) is determined by the relative amounts of fumaryl halide/maleiyl halide in relation to the amount of itaconyl halide used and also the amount of saturated halide substituted dicarboxylic acids (IV.b.) used in the formation of the polyamide. The addition of saturated acid halides, such as succinyl chloride (IV.b.), allow the polyamide (III) to rotate and orient about the succinyl saturated carbon-carbon bond, thus allowing the polyamide (III) and resulting polysiloxane(amide-ureide) to orient in a near-linear orientation. Saturated acid halides such as succinyl, malonyl or other saturated acid halides may be used in conjunction with the unsaturated acid halides to create a polyamide (III) having a combination of crystalline and amorphous domains in order to control the toughness of the resultant polysiloxane(amide-ureide).

According to various embodiments of the present invention, the polysiloxane(amide-ureide) shows improved anti-icing properties when formed into an amorphous structure with some small amount of crystallinity for enhanced toughness. Maleiyl or fumaryl halide cause the structure of the polymer to be non-linear about the carbon-carbon double bonds in the maleiyl and fumaryl entities. The combined maleiyl and fumaryl, or other unsaturated diacid halide, content is therefore preferably greater than 50 mol % of the dicarboxylic acid halide used in preparation of the polysiloxane(amide-ureide). It is more preferable that the unsaturated diacid halides comprise between about 75% and 99% of the diacid halides. The disorientation caused by the fumaryl halide and maleiyl halide give the resulting polysiloxane (amide-ureide) an amorphous structure, but the introduction of a saturated diacid halide helps to increase the toughness of the polymer compared with linear polymers having amide or ureide moieties. Additionally, the introduction of an itaconyl halide also helps to increase the toughness of the polymer due to its ability to crosslink after reacting with the diamines. By balancing the non-linear orientation of the polymer with the addition of additional aromatics and vinyl groups (e.g. amide linking itaconyl halides) makes the polysiloxane(amide-ureide) less brittle than polyureides produced with linear diisocyanates such as methylene diphenyl diisocyanate and also less soft and sticky as the polymers described in U.S. Pat. No. 6,797,795. Being less brittle, the polysiloxane(amide-ureide) is more durable and longer lasting than industrially available polyureides, and is able to resist the environment associated with ice formation without being damaged. A further differentiation over that of U.S. Pat. No. 6,797,795 is the fact that in the referenced patent there is only one amide group per polymer chain and the ureide is attached to a soft, amorphous, sticky polysiloxane. According to embodiments of the present invention, there may be more than one amide group per chain since it is possible to have both polysiloxane diamines and other diamines co-reacted to reduce the percent amorphous domain and increase the amide content to increase the percent crystalline domain obtained from inter-chain hydrogen bonding from the greater percent of the amide moiety. Furthermore, the increase in the mole percent of diamines over and above that of the polysiloxane diamine, as well as the larger percentage of diisocyanate, further increases the crystalline domain. Thus, the polysiloxane is attributable to the amorphous domain and the crystalline domain is attributable to ureide and/or amide, particularly with aromatic groups. It is possible to ascertain the percent crystallinity from the molar percent polysiloxane used relative to the molar percent of the aromatic moieties and amide and ureide moieties formed.

Diisocyanate (V) according to the present invention can include linear and non-linear diisocyanates to form the polysiloxane(amide-ureide). The non-linear diisocyanates generally have the structure of:

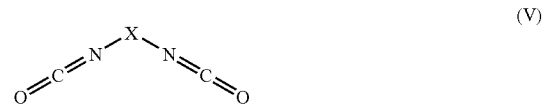

(V)

where X is an aliphatic or aromatic moiety and the two isocyanate groups are bound to the X moiety so as to be positioned in a non-linear relationship with respect to one another. The amine endgroups of the polyamide (III) react with the isocyanate endgroups of the non-linear diisocyanates (V) to form urea linkages As with the non-linear dicarboxylic acids, the purpose of utilizing a non-linear diisocyanate is to give the resulting polysiloxane(amide-ureide) an overall non-linear orientation, which results in a polymer that is more amorphous and less crystalline. Non-linear aliphatic or aromatic diisocyanates may be used, with ortho or meta oriented aromatic diisocyanates being preferred. However, by incorporating aromatic diamines and itaconyl amide linking groups, the resulting polysiloxane(amide-ureide) according to embodiments of the invention show a greater chain to chain interaction which in turn decreases the amorphous structure as previously obtained in U.S. Pat. No. 6,797,795 and provides an increase in crystallinity to improve the toughness of the polymer.

The functionality of the diisocyanates is gained from the dual isocyanate groups being located in a non-linear relationship around an aliphatic or aromatic carbon structure. Polyisocyanates, i.e., those compounds having three or more isocyanate groups, may be used for enhanced crosslinking of the resulting polysiloxane(amide-ureide). Otherwise, the diisocyanates may be unsubstituted or substituted with groups such as alkyl, alkoxy, halogen, benzyl, allyl, unsubstituted or substituted aryl, alkenyl, alkinyl, amide, or combinations thereof.

Examples of acceptable diisocyanates include 1,5-naphthalene diisocyanate, 4,4-diphenyl-methane diisocyanate, tetra-alkyl-diphenyl methane diisocyanate, 1,3-phenylene diisocyanate, 1,4-phenylene diisocyanate, butane-1,4-diisocyanate, hexamethylene 1,6-diisocyanate, 2,2,4-trimethyl-hexamethylene 1,6-diisocyanate, 2,4,4-trimethyl-hexamethylene 1,6-diisocyanate, cyclohexane-1,4-diisocyanate, xylilene diisocyanate, dicyclohexyl-methane-4,4'-diisocyanate, methyl-cyclohexane diisocyanate, 1,4-tetramethylene diisocyanate, hexamethylene diisocyanate, 1,3-trimethylene diisocyanate, metaxylene diisocyanate, decamethylene 1,10-diisocyanate, cyclohexylene 1,2-diisocyanate, cyclohexylene 1,4-diisocyanate, 1-methyl cyclohexane 2,4-diisocyanate, 2,4-toluene diisocyanate, hexamethylene-1,6-diisocyanate, heptamethylene-1,7-diisocyanate, 1,3-cyclopentene diisocyanate, and 1,3-cyclohexane diisocyanate, most of which are commercially available from Aldrich™ of Milwaukee, Wis. Other exemplary diisocyanates include those described in U.S. Pat. Nos. 6,008,410 and 6,353,135, as well as isothiocyanates.

In various preferred embodiments, trialkoxy-aminosilanes are incorporated into the polysiloxane(amide-ureide) such that the polymer is terminated with a trialkoxy-aminosilane. For instance, the trialkoxy-aminosilane according to one embodiment of the present invention can have a structure according to the following general formula:

$$H_2N-R-Si-(OR')_3 \quad (VI.)$$

wherein R can be an alky (saturated or unsaturated); an aryl, a heterocyclic, an aralkyl or an alicyclic (saturated or unsaturated); R' can be alkyl or alicyclic.

In such embodiments, the trialkoxy-aminosilane terminated polymer exhibits improved adherence to glass and similar surfaces. The trialkoxy-aminosilane groups essentially couple the polysiloxane(amide-ureide) polymer to the glass surface. Although numerous trialkoxy-silanes are contemplated by the present invention, preferred trialkoxy-silanes are triethoxy or trimethoxy aminopropyl silane. When incorporated into the polymer, the trialkoxy-aminosilanes enhance bonding to the glass and coupling to the polysiloxane backbone.

In one embodiment of the present invention, the molar percent of the substituted aryl, alky, or hetero-silane, wherein the substitution can be an amino, hydroxyl, mercaptal group, or any other group such that the silane is capable of reacting with either an acid chloride, isocyanate, or isothiocyanate; such as a trialkoxy-aminosilane, is based on the stoichiometry of the aromatic diamine used. By way of example, if the molar amount of the aromatic diamine is reduced by, for example only, about 0.1 mole percent, then this amount of trialkoxy-aminosilane is added to make up the one molar equivalent of aromatic diamine needed for the stoichiometric reaction with the diisocyanate used.

In another embodiment, it is possible to create block copolymers of the polysiloxane(amide-ureide). To create the block copolymer, a first amine-terminated aromatic (II) or polysiloxane (I) is reacted with a diacid halide (IV), preferably in a molar ratio of 2:1 (polysiloxane:diacid halide) to form a first product. Separately, a second amine-terminated aromatic (II) or polysiloxane (I) is reacted with a diisocyanate (V), preferably in a molar ratio of 2:1 (polysiloxane:diisocyanate) to form a second product. The two products (each amine-terminated) are then reacted with a second diacid halide, which may be the same or different from the first diacid halide, to result in a block copolymer(amide-ureide). Alternatively, the two amine-terminated products may be reacted with a diisocyanate to form a block copolymer.

In yet another embodiment, it is possible to create various random polymers by reacting at least one amine terminated polysiloxane (I), at least one aromatic diamine (II); at least one diisocyanate (V); and at least one halide substituted dicarboxylic acid (IV) in situ. In other embodiments, a trialkoxy-aminosilane can also be reacted in situ such that the resulting polysiloxane(amide-ureide) is terminated by the trialkoxy-aminosilane groups.

The invented polysiloxane(amide-ureide)s have several functional aspects which combine to make the polysiloxane (amide-ureide)s superior, durable, and long lasting anti-icing agents and corrosion resistant which can be used on a wide variety of surfaces.

It has been found that the urea groups of the polysiloxane (amide-ureide)s act to disrupt the hydrogen bonding between molecules of water, which inhibits the formation of ice and also greatly diminishes the adhesion of ice to the polysiloxane (amide-ureide)s when the polysiloxane(amide-ureide)s are used as a coating layer upon a substrate. So, the polysiloxane (amide-ureide)s anti-icing agent acts first to inhibit the formation of ice, and secondly to inhibit the ability of ice to adhere to a coated surface. The polysiloxane portion of the polymer chain is hydrophobic, hence water does not readily sheet out, but tends to bead up. The urea moiety, in weakening the hydrogen bonding of the water molecule causes the resultant ice to have a weak structure which prevents water from forming a strong ice crystal layer upon a coating of the polysiloxane(amide-ureide)s, thus allowing it to be easily broken away from the coating.

In various embodiments of the present invention, an amine equivalent of the polysiloxane diamime (as described in U.S. Pat. No. 6,797,795) is replaced with an aromatic diamine such as p-phenylene diamine, p,p'-diphenyldiamine, ortho-tolidine, meta-tolidine, or diphenyldiamine (among others) and some of the amide-linking moiety are changed from a succinyl dichloride or a fumaryl dichloride to an itaconyl dichloride. Accordingly, the ureide and amide concentration of the polymer backbone is increased without appreciably affecting the chain length of the polysiloxane backbone. Thus, by decreasing the concentration of the polysiloxane diamine and adding an aromatic diamine such as p,p'-diphenyldiamine, o-tolidine or meta-tolidine in a stoichiometric amount equivalent to the amount of polysiloxane diamine that was reduced, the resulting polysiloxane(amide-ureide)s exhibit a greater degree of coplanarity and hence a greater chain-to-chain interaction which decreases the amorphous structure previously obtained and increases the crystallinity; thus, increasing the toughness of the polysiloxane (amide-ureide).

A further enhancement is obtained from incorporating itaconyl dichloride which, after reacting with the diamines (aromatic or polysiloxane), is capable of undergoing crosslinking from the highly reactive vinyl side group of the itaconyl moiety. In a preferred embodiment, a small percentage of a trialkoxy-aminosilane such as triethoxy (or trimethoxy)aminopropyl silane is added to the mix to enhance bonding to smooth inorganic surfaces such as glass. The trialkoxy-aminosilane couples the polysiloxane backbone to glass or similar transparencies.

These modifications result in a tough, strongly adherent anti-icing coating for any surface, whether metal, graphite (carbon) composite, plastic or glass. Additionally, with the increased concentration of aromatic groups and crosslinking the coating, there is a further advantage, namely, enhanced corrosion resistance. The increased toughness and hydrophobicity (from the aromatic species) minimize the penetration of ionic moieties thereby preventing ionic and electromotive corrosion. Particularly, as is well-known, urea (and ureides) affect the hydrogen bonding of water, thereby affecting the solubility of ionic species and, consequently, as mentioned, above, decrease corrosion. Further, the increased ureide content enhances the anti-icing capability and crosslinking, due to interchain hydrogen bonding, as exists in the case of polyamides, such as nylon and aramids; and further crosslinking as that obtained from reactions of the vinyl group in the itaconic moiety, thereby increasing the durability of the coating.

The crosslinking of the polysiloxane can be through the reactivity of the vinyl group attached to the itaconic moiety; and this could be through reactions of dihydrogen silanes, e.g., H—$S_i$—R—$S_i$—H; diamino silanes, e.g., $NH_2$—$S_i$—R—$S_i$—$NH_2$; dihydroxysilanes, e.g., HO—$S_i$—R—$S_i$—OH or simply the reactivity of the double bond with either itself or another double-bonded compound, such as, a maleic, vinyl, allylic, or acetylenic compound. Further, this can be effected after the coating is applied either through a free radical, UV light, ionically, or electronically, e.g., electrostatic discharge.

The polysiloxane(amide-ureide) according to embodiments of the present invention may be applied as a continuous coating upon a wide variety of surfaces, particularly metal surfaces such as aluminum or titanium and transparencies such as glass. The coating may also be suitably applied to painted surfaces (or unpainted surfaces) or to composite surfaces such as resin matrices of graphite or glass fibers. Because the coating is continuous, water cannot penetrate the coating. It is believed that the penetration of water into sintered coatings, such as Teflon™, result in the gradual degradation in icephobic properties of such sintered coatings. There is no such related degradation in the invented polysiloxane(amide-ureide).

Thus, the polysiloxane(amide-ureide) has anti-icing properties not previously found in polyamides. It has degradation and corrosion resistance not previously found in polyureides. And, it has physical toughness and durability not previously found in polyamides or polyureides.

The polysiloxane(amide-ureide) may be applied to a substrate in a number of ways. For instance, it may be applied to substrate surfaces by simply brushing the polymer composition upon a substrate. As a one component brush-on, a solution of the polysiloxane(amide-ureide) in methylene chloride/toluene mixture (1:1 ratio) is brushed onto a substrate to be coated. After the solvent is removed, a uniform film of polymer is left behind.

Alternatively, the polysiloxane(amide-ureide) may be dissolved in a solvent, such as methylene chloride at a concentration of about 50 percent solids, for example, and sprayed onto the substrate. The solvent, being low boiling, evaporates rapidly and a film of polysiloxane(amide-ureide) is left behind.

In a one component spray, the polysiloxane(amide-ureide) is capable of being handled or walked upon as soon as the solvent has all evaporated. Use of a heat source, such as hot air or infrared lamps, will accelerate the solvent removal to leave behind a useable film.

The coating is a clear film coating and may be applied onto a wide variety of surfaces, including painted surfaces. Alternatively, the coating may be pigmented by mixture of one or more of the reaction components with a suitable pigment in a colloid mill. The pigmented coating may then be used as a paint.

In one embodiment, the polymeric film of the polysiloxane (amide-ureide) is produced by dissolving it in a solvent such as methylene chloride/toluene (1:1), which can be pigmented or unpigmented, and spraying or brushing it onto the surface. The thickness of the film can be from 0.0005" to 0.05", or from 0.00075" to 0.025", preferably about 0.001" to 0.01".

The polysiloxane(amide-ureide) is hydrophobic and tends to displace any moisture upon surfaces when applied, therefore the polysiloxane(amide-ureide) may be applied successfully to wet or damp surfaces. The polymer can be applied anywhere between about minus 40° F. and about 250° F., and the polymer coating is stable to about 350° F. The coating may be applied in a single layer having any desired thickness, eliminating the need for multi-coat applications.

The coating may be applied as an appliqué by first depositing the coating, as described above, upon a relief surface such as Teflon™. When dry, the coating may be removed from the release surface and used in an appliqué process.

The usefulness of the polysiloxane(amide-ureide) is not limited to metal surfaces. The polysiloxane(amide-ureide) finds use as a coating on any of a wide variety of substrates such as carbon composites, even wood or asphalt, and transparencies such as glass, a number of which may be applications unrelated to aircraft.

EXAMPLES

Example 1 (Polymer 1)

A 20 mole percent random polymer was made in tetrahydrofuran (THF) by reacting 48.19 g (0.012 m) of polysiloxanepropylamine-terminated, herein after termed "PS510" and 0.64 g (0.003 m) of o-tolidine with 1.15 g (0.0075 m) of fumaryl chloride in the presence of sodium carbonate followed by 1.31 g (0.0075 m) of 2.4-toluene diisocyanate. The polymer was precipitated in water and washed with isopropyl alcohol then air dried. This yielded 44 g of a bright yellow, hard elastomeric polymer.

Example 2 (Polymer 2)

A 20 mole percent random polymer was made in tetrahydrofuran by reacting 48.19 g (0.012 m) of PS510 and 0.59 g (0.003 m) of methylene dianaline with 1.15 g (0.0075 m) of fumaryl chloride in the presence of sodium carbonate followed by 1.31 g (0.0075 m) of 2.4-toluene diisocyanate. The polymer was precipitated in water and washed with isopropyl alcohol then air dried. This yielded 40 g of a light tan, hard elastomeric polymer.

Example 3 (Polymer 3)

A 20 mole percent random polymer was made in methylene chloride by reacting 48.19 g (0.012 m) of PS510 and 0.60 g (0.003 m) of 4,4'-oxydianaline with 1.15 g (0.0075 m) of fumaryl chloride in the presence of 15.0 g (0.15 m) triethylamine followed by 1.31 g (0.0075 m) of 2.4-toluene diisocyanate. The polymer solution was extracted with brine, saturated bicarbonate and deionized water. The solution was then dried with magnesium sulfate, decolorized with activated carbon and pressure filtered. This yielded 49.3 g of a very light yellow, hard elastomeric polymer.

Example 4 (Polymer 1 Alternative Method)

A 20 mole percent random polymer was made in methylene chloride by reacting 48.19 g (0.012 m) of PS510 and 0.64 g (0.003 m) of o-tolidine with 1.15 g (0.0075 m) of fumaryl chloride in the presence of 15.0 g (0.15 m) triethylamine followed by 1.31 g (0.0075 m) of 2.4-toluene diisocyanate. The polymer solution was extracted with brine, saturated bicarbonate and deionized water. The solution was then dried with magnesium sulfate, decolorized with activated carbon and pressure filtered. This yielded 49.4 g of a bright yellow, hard elastomeric polymer.

Example 5 (Polymer 4)

A 20 mole percent random polymer was made in methylene chloride by reacting 48.19 g (0.012 m) of PS510 and 0.59 g (0.003 m) of methylene dianaline with 1.15 g (0.0075 m) of fumaryl chloride in the presence of 15.0 g (0.15 m) triethylamine followed by 3.75 g (0.0075 m) of 4,4'-diphenyl methane diisocyanate. The polymer solution was extracted with brine, saturated bicarbonate and deionized water. The solution was then dried with magnesium sulfate, decolorized with activated carbon and pressure filtered. This yielded 49.1 g of a tan, slightly opaque, hard elastomeric polymer.

Example 6 Polymer 2 (Alternative Method)

A 20 mole percent random polymer was made in methylene chloride by reacting 48.19 g (0.012 m) of PS510 and 0.59 g (0.003 m) of methylene dianaline with 1.15 g (0.0075 m) of fumaryl chloride in the presence of 15.0 g (0.15 m) triethylamine followed by 1.31 g (0.0075 m) of 2.4-toluene diisocyanate. The polymer solution was extracted with brine, saturated bicarbonate and deionized water. The solution was then dried with magnesium sulfate, decolorized with activated carbon and pressure filtered. This yielded 49.1 g of a very light tan, hard elastomeric polymer.

EVALUATION

The polymers were mechanically coated from either THF or methylene chloride solutions on to glass and 7075T6 aluminum plates using a doctor blade with a gap of 0.0015 in. The films were dried at room temperature for 30 minutes followed by 30 minutes at 220° F. and were approximately 0.001 in. thick after drying.

Glass plates were utilized for evaluating optical clarity, water repellency and ice adhesion. Polymer 3 provided excellent optical properties with no distortion at center or edge boundaries and no detectable color against a standard white background. Other polymers were either colored or exhibited some degree of opacity.

All polymers exhibited excellent water repellency. Water was placed on the coated surfaces and formed beads with a very high contact angle relative to bare glass (i.e. untreated). For instance, 0.5 mL beads rolled off freely at tilt angles of 200-250 versus 45° for bare glass.

Ice adhesion was tested by placing five 0.5 mL beads of water on each plate and freezing overnight at −20° F. Removal was effected by brushing with a ¼ in. soft, adhesive applicator brush. The ice was easily removed from all polymer coated plates but not from bare (i.e. untreated) glass.

Aluminum plates treated with polymer 1 and aluminum plates treated with polymer 3 were placed in a salt fog chamber at 96° F. for 500 hr (21 days) and were inspected at 7, 14 and 21 days. Corrosion evaluation was completed for polymers 1 and 3. After 500 hours, the plates coated with polymer 1 and the plates coated with polymer 3 were free of corrosion.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A polysiloxane(amide-ureide) polymer which inhibits the ability of ice to adhere to a surface of a physical object, said polysiloxane(amide-ureide) polymer comprises a backbone comprising the reaction product of the following:
   (i) at least one diamine-terminated polysiloxane of the general formula:

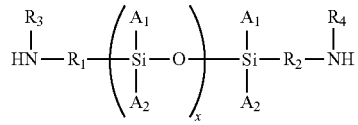

wherein, for each unit of the polysiloxane $R_1$ and $R_2$ are independently selected from the group consisting of $C_1$ to $C_{10}$ alkyls, aryls, and polyaryls; for each unit of the polysiloxane $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles; for each unit of the polysiloxane $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; for each unit of the polysiloxane, x is a number from 1 to 1000;
   (ii) at least one an aromatic diamine;
   (iii) at least one diisocyanate; and
   (iv) at least one halide substituted dicarboxylic acid.

2. A polysiloxane(amide-ureide) polymer according to claim 1, wherein the at least one halide substituted dicarboxylic acid comprises itaconyl dichloride.

3. A polysiloxane(amide-ureide) polymer according to claim 1, wherein the polysiloxane(amide-ureide) polymer is terminated by at least one substituted aryl, alkyl, or hetero-silane, wherein the substituted aryl, alkyl, or hetero-silane is substituted with an amino, hydroxyl, or mercaptal group.

4. A polysiloxane(amide-ureide) polymer according to claim 2, wherein the polysiloxane(amide-ureide) polymer is terminated by at least one substituted aryl, alkyl, or hetero-silane, wherein the substituted aryl, alkyl, or hetero-silane is substituted with an amino, hydroxyl, or mercaptal group.

5. A polysiloxane(amide-ureide) polymer according to claim 4, wherein the polymer is terminated with at least one trialkoxy-aminosilane residue.

6. A polysiloxane(amide-ureide) polymer according to claim 1, wherein the at least one aromatic diamine is selected from the group consisting of 2,5-diaminobenzotrifluoride, 2,2'-Bis(trifluoromethyl)benzidine, 3,3'-Bis(trifluoromethyl) benzidine, 4,4'-methylenedianiline, 2,2-Bis[4(4-aminophenoxy)phenyl]hexafluoropropane, 2,2-Bis[4(4-aminophenoxy)phenyl]propane, 4,4'-oxydianiline, 4,4'-diaminodiphenylsulfide, 4,4'-diaminophenylsulfone, 1,4-Bis(4-aminophenoxy)benzene, 4,4'-Bis(4-aminophenoxy)biphenyl, 1,3-Bis(4-aminophenoxy)benzene, 1,3-Bis(3-aminophenoxy)benzene, o-tolidinesulfone, 3,3'-5,5'-tetramethylbenzidine, 2,7-Diamino fluorene, 2,4-Diamino-6-(3,5-difluorophenyl)-1,3,5-triazine, 1,3-Bis(4-aminophenoxy)propane, 2,4-Diamino-6-phenyl-1,3,5-triazine, 2,4-Diamino-6 [3-(trifluoromethyl)phenyl]-1,3,5-triazine, 2,6-diamine pyridine and combinations thereof.

7. A polysiloxane(amide-ureide) polymer according to claim 1, wherein the at least one diisocyanate is selected from the group consisting of 1,4-phenylene diisocyanate, 4,4'-diphenylmethane diisocyanate, cyclohexane-1,4-diisocyanate, butane-1,4-diisocyanate, hexamethylene-1,6-diisocyanate, 1,5-naphthalene diisocyanate, dicyclohexyl-methane-4, 4'-diisocyanate, cyclohexylene-1,4-diisocyanate, isophorone diisocyanate, toluene 2,4-diisocyanate, toluene 2,6-diisocyanate, 2,4'-diphenylmethane diisocyanate, 2,2'-diphenylmethane diisocyanate, 4,4'-diisocyanate-diphenylethane-(1, 2), and combinations thereof.

8. A polysiloxane(amide-ureide) polymer according to claim 1, wherein the at least one halide substituted dicarboxylic acid is selected from the group consisting of fumaryl halide, maleiyl halide, itaconyl halide, succinyl halide, phthalyl halide, isophthalyl halide, terephthalyl halide, 2,6-naphthyl halide, and combinations thereof.

9. A polysiloxane(amide-ureide) polymer according to claim 1, the polysiloxane(amide-ureide) comprises a polymer according to the general formula:

m or n a or b m or n x or y wherein,
"m" is polysiloxane diamine;
"n" is an aromatic diamine;
"a" is a diacid halide;
"b" is a diacid halide, but different from "a";
"x" is a diisocyanate;
"y" is a diisocyanate, but different from "x";
"m" and "n" each have a mole fraction value from 0.05 to 0.95, such that the sum of the mole fractions of "m"+"n" is equal to 1; and
"a", "b", "x" and "y" each have a mole fraction value from 0 to 1, such that the sum of the mole fractions of "a"+"b"+"x"+"y" is greater than or equal to 0.01 and the sum of the mole fractions of "x"+"y" is greater than or equal to 0.01, wherein the sum of "a"+"b" is not 0.

10. A random polysiloxane(amide-ureide) polymer comprising the reaction product of the following:
(i) at least one diamine-terminated polysiloxane of the general formula:

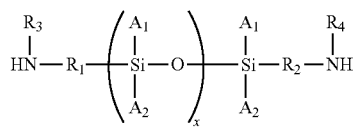

wherein, for each unit of the polysiloxane $R_1$ and $R_2$ are independently selected from the group consisting of $C_1$ to $C_{10}$ alkyls, aryls, and polyaryls; for each unit of the polysiloxane $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles; for each unit of the polysiloxane $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; for each unit of the polysiloxane, x is a number from 1 to 1000;
(ii) at least one an aromatic diamine;
(iii) at least one diisocyanate;
(iv) at least one halide substituted dicarboxylic acid; and
(v) at least one amine functional trialkoxy-silane.

11. A random polysiloxane(amide-ureide) polymer according to claim 10, wherein the at least one halide substituted dicarboxylic acid comprises itaconyl dichloride.

12. A coating which inhibits the ability of ice to adhere to a surface of a physical object, said coating comprising a polysiloxane(amide-ureide) polymer according to claim 1.

13. A coating which inhibits the ability of ice to adhere to a surface of a physical object, said coating comprising a polysiloxane(amide-ureide) polymer according to claim 2.

14. A coating which inhibits the ability of ice to adhere to a surface of a physical object, said coating comprising a polysiloxane(amide-ureide) polymer according to claim 3.

15. A coating which inhibits the ability of ice to adhere to a surface of a physical object, said coating comprising a polysiloxane(amide-ureide) polymer according to claim 4.

16. A method of producing a polysiloxane(amide-ureide) comprising:
reacting at least one diamine-terminated polysiloxane, at least one aromatic diamine; at least one diisocyanate; at least one halide substituted dicarboxylic acid; and at least one amine functional trialkoxy-silane.

17. A method according to claim 16, wherein the at least one diisocyanate comprises an aromatic.

18. A substrate resistant to ice formation, comprising a substrate having an external surface and an ice resistant polymer coating on at least a portion of the external surface, wherein said polymer coating is formed from a polysiloxane (amide-ureide) polymer according to claim 1.

19. A substrate resistant to ice formation, comprising a substrate having an external surface and an ice resistant polymer coating on at least a portion of the external surface, wherein said polymer coating is formed from a polysiloxane (amide-ureide) polymer according to claim 4.

20. A substrate according to claim 19, wherein the substrate is selected from the group consisting of metal, carbon composites, wood, asphalt, resin matrices containing graphite, carbon, glass fibers, transparencies, painted and unpainted substrates, or combinations thereof.

21. A method of rendering a surface icephobic and resistant to corrosion comprising applying a coating of a polysiloxane (amide-ureide) polymer according to claim 1 onto a surface.

22. A method according to claim 21, further comprising dissolving the polysiloxane(amide-ureide) polymer in a solvent and spraying the resulting solution of the polysiloxane (amide-ureide) polymer onto the surface.

23. A method according to claim 21, wherein the coating comprises a polymeric melt of the polysiloxane(amide-ureide) polymer.

24. A method according to claim 21, wherein the surface is selected from the group consisting of metal, carbon composites, wood, asphalt, resin matrices containing graphite, carbon, glass fibers, transparencies, surfaces being painted or unpainted or combinations thereof.

25. A method according to claim 21, wherein the surface is glass.

26. A method according to claim 21, wherein the surface is one of a power line, a bridge, a marine vehicle, an aircraft and a spacecraft.

27. A method according to claim 22, wherein the polysiloxane(amide-ureide) polymer coating is applied to the surface as a solution of the polymer in methylene chloride/toluene mixture (1:1 ratio) onto the surface.

28. A method of deicing a substrate comprising the steps of:
(a) coating the substrate with a polysiloxane(amide-ureide) polymer coating, wherein the polysiloxane(amide-ureide) polymer includes a backbone comprising the reaction product of the following:
(i) at least one diamine-terminated polysiloxane of the general formula:

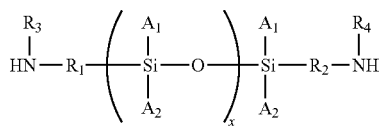

wherein, for each unit of the polysiloxane $R_1$ and $R_2$ are independently selected from the group consisting of $C_1$ to $C_{10}$ alkyls, aryls, and polyaryls; for each unit of the polysiloxane $R_3$ and $R_4$ are independently selected from the group consisting of hydrogen, $C_1$ to $C_6$ alkyls, aryls, $C_3$ to $C_6$ cycloaliphatics, and $C_3$ to $C_6$ heterocycles; for each unit of the polysiloxane $A_1$ and $A_2$ are independently selected from the group consisting of hydrogen, $C_1$ to $C_6$ alkyls, aryls, polyaryls, $C_3$ to $C_6$ cycloaliphatics, and $C_3$ to $C_6$ heterocycles; for each unit of the polysiloxane, x is a number from 1 to 1000;

(ii) at least one aromatic diamine;
(iii) at least one diisocyanate; and
(iv) at least one halide substituted dicarboxylic acid, wherein the resulting polysiloxane(amide-ureide) polymer comprises a random polymer, said random polymer is terminated with at least one substituted aryl, alkyl, or hetero-silane, wherein the substituted aryl, alkyl, or hetero-silane is substituted with an amino, hydroxyl, or mercaptal group;

(b) exposing the coated substrate to conditions favorable to the formation of ice upon the surface of the substrate; and (c) removing any accumulated ice from the surface of the substrate by application of physical force.

29. A method according to claim 28, wherein the substrate is selected from the group consisting of consisting of metal, carbon composites, wood, asphalt, resin matrices containing graphite, carbon, glass fibers, transparencies, painted or unpainted surfaces, or combinations thereof.

30. A method according to claim 28, wherein the substrate is glass.

* * * * *